Patented Aug. 18, 1925.

1,549,859

UNITED STATES PATENT OFFICE.

EMANUEL FABIAN, OF BERLIN-CHARLOTTENBURG, GERMANY, ASSIGNOR TO HERMANN HURWITZ & CO., OF BERLIN, GERMANY. (FIRMA.)

PROCESS FOR THE MANUFACTURE OF REPRODUCTIONS.

No Drawing. Application filed August 12, 1922. Serial No. 581,545.

*To all whom it may concern:*

Be it known that I, EMANUEL FABIAN, a citizen of Switzerland, residing at No. 8 Carmerstrasse, Berlin-Charlottenburg, Germany, have invented certain new and useful Processes for the Manufacture of Reproductions, of which the following is a specification.

My invention relates to improvements in the process of copying documents. A process of copying documents, drawings and the like is already known in which a latent copy is obtained on an inert rigid surface (for example a matt glass) by the interaction of an alkaline reacting ink with alum or other aluminium salt carried therefrom, the latent copy being capable of retaining fatty colouring matter or printer's ink, particularly fatty inks containing glycerine, whilst the blank portions of the surface do not retain the fatty inks. (See U. S. Patent 1,067,652.)

I have now found that the latent copy can also be produced if the copying surface is prepared with solutions of various other metallic salts which with alkalies, in particular with ammonia or other precipitating agents used as a constituent of the ink for producing the original, form insoluble oxides, hydroxides or other insoluble compounds suitable for use as a constituent of ink.

For example, I have found that such latent fatty ink retaining printing surfaces can be obtained if the surface is prepared with iron salts, particularly ferric oxide salts, or with salts or zinc, copper, silver, tin or the like (hereinafter referred to as "salt of a heavy metal"). Said group of metals can each be referred to as "a metal which in the free state and substantially pure" has a specific gravity between about 7 and about 10.5; such metal having an atomic weight between about 56 and about 119; such metal being one of which the sulfide is insoluble in water and stable in the presence of water, and of which the hydroxid is insoluble in water; such metal being one that in the free state does not rapidly decompose water at ordinary room temperature. In every case the same difference occurs between the action of the fatty colouring matter towards the blank portions of the surface and towards the latent copy produced by contact of the original which is produced in precipitating ink, i. e. ink containing ammonia or other alkalies, as above described.

I have also found that this effect can also be produced if the inert surface, (which hitherto consisted, for example, of matt glass), is replaced by a plate of a metal (aluminum or a heavy metal) whose salts, as above described, produce the necessary reaction with the precipitating ink. It is then necessary to prepare the plate in such a manner that an infinitely thin layer of the salt is formed from the metal of the plate itself on the surface, for reaction with the ink.

The following examples are given of the improved copying process:

*Example I.*—Very dilute hydrochloric acid is spread over an aluminium plate. Any of the known additive substances may also be present in the acid. The acid solution is rubbed into the surface of the plate until the latter is dry. This produces an infinitely thin layer of aluminum chlorid on the surface of the plate. The original produced with an alkaline ink (for example, ammoniacal ink) is then laid on the plate and after removal the plate is inked in the usual manner with a fatty ink which may be rolled or rubbed on to the surface. Any of the known substances, such as glycerine, may be incorporated in the fatty ink. The plate thus prepared is then ready for printing from in the same manner as the inert glass plate.

*Example II.*—A sufficiently silvered plate, for example of brass or copper, is rubbed with a preparing liquid containing nitric acid in a very dilute state. The plate is rubbed until dry and after contact with the original as above described can be inked with fatty ink and printed from in the usual manner.

*Example III.*—A polished matt plate of practically pure iron is rubbed until dry with a liquid containing a very dilute solution of hydrochloric and sulphuric acids and a little nitric acid and then brought in the usual manner into contact with the original written in alkaline ink. This plate also produces a latent copy which can be printed from when rubbed with a fatty ink roller.

For obtaining the result aimed at, the nonprinting or blank parts of the printing surface must retain a certain acidity and moistness even when taking many prints therefrom, in order that the said blank parts be able to repel the fatty ink and the ink be retained only on the lines composing the record.

By the use of the present invention, a greatly increased number of prints can be made before the original impression becomes worn out or blurred, this being due (at least) partly to the difference in the metal salts used and (sometimes) partly to the difference in the base. By my present process I am not restricted to the use of a glass or like inert base, but I can use also metal if desired.

I have found that a preferred way of keeping the surface in a sufficiently damp and acid state consists in adding a mixture of a suitable acid and glycerine to the fatty ink used in the printing operation and converting the mixture into an emulsion. When rolling or rubbing the ink thus prepared into the surface of the plate the blank foundation takes the acid and glycerine from the ink and repels the fatty ink.

Acids which are suitable for thus treating the ink are for example mineral acids such as sulfuric or nitric acid. However, I have found that with these acids the use of exactly the optimum quantity is difficult, a very slight excess of the said strong acids having an objectionable action on the lines composing the record. Therefore I prefer to use the strong organic sulfonic acids or carboxylic acids, such as oxalic acid, tartaric acid, malic acid, phenol sulfonic acid, and the like. The best results have been obtained when using the non-alkaline salts of the said acids such as potassium-sodium tartrate (Rochelle salt). When dissolving the said salt in dilute glycerine and making an emulsion thereof in the ink, the said salt strengthens the acidity of the non-printing or blank portions of the foundation whenever applying the ink thereto, or at least the acidity is not weakened, and the foundation remains clear, so that practically an unlimited number of prints can be taken from the same printing surface.

My improved ink may be used in connection with inert matt glass surfaces or with metallic surfaces such as aluminium plates; however in connection with metal plates, such as aluminium plates which for example are first prepared by means of a nitric acid mordant, and then have the matter written on the original document or the like in alkaline ink pressed thereto, and finally have glycerine and ink applied thereto by rubbing or rolling, the use of my improved ink is particularly satisfactory, because such plates are more liable to be spoiled than glass plates.

I have found that my improved ink containing an acid or salt emulsion can be used with good results in lithography, and that in this case wetting after each printing may be dispensed with, which results in a great saving of work and time, and avoids irregular operation.

I claim:

1. A method of producing a printing surface, which comprises treating a metallic foundation with an acidulous reagent capable of transforming the surface portion of the plate into a metallic salt, thereafter applying thereto an original produced with an ink containing an alkaline precipitating agent, whereby a metal compound is precipitated from such metallic salt, and thereafter inking the said foundation with an ink having a fatty base.

2. The method of producing a printing surface, which consists in treating a metallic foundation with an agent capable of transforming the surface portion thereof into a metallic salt adapted upon contact with a precipitating medium to produce an insoluble compound, applying thereto an original product with an ink containing an agent capable of precipitating a metal compound from such metallic salt and thereafter inking the foundation with ink having a fatty base.

3. A process which comprises applying an acid material to a plate of a metal which in the free state and substantially pure, has a specific gravity between about 7 and about 10.5; such metal having an atomic weight between about 56 and about 119; such metal being one of which the sulfid is insoluble in water and stable in the presence of water and of which the hydroxid is insoluble in water; such metal being one that in the free state does not rapidly decompose water at ordinary room temperature, allowing the same to react with the surface portion of said metal to form a salt thereof, drying the same, applying to said plate an alkaline precipitating agent on those portions where it is desired to form a printing image, and thereafter applying a fatty ink to said plate, whereby the said ink adheres to those parts where the alkali was applied.

EMANUEL FABIAN.